Sept. 14, 1954  D. J. DE ROSE  2,689,002
TRAILER AWNING
Filed July 17, 1951
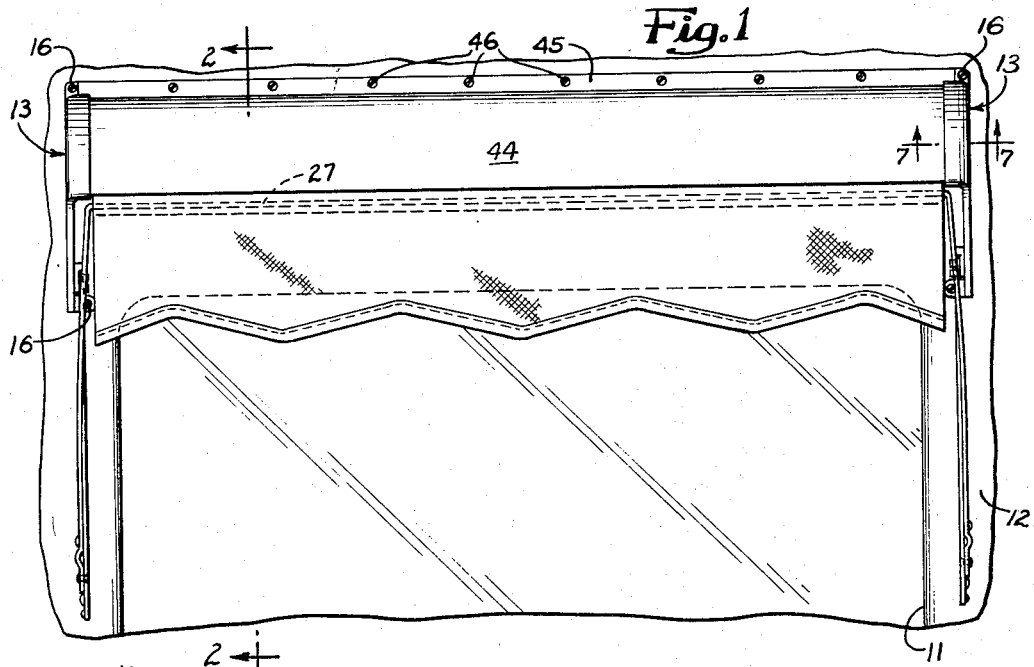
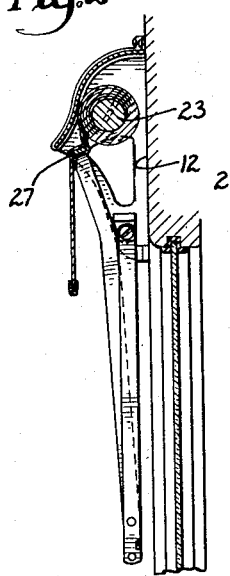
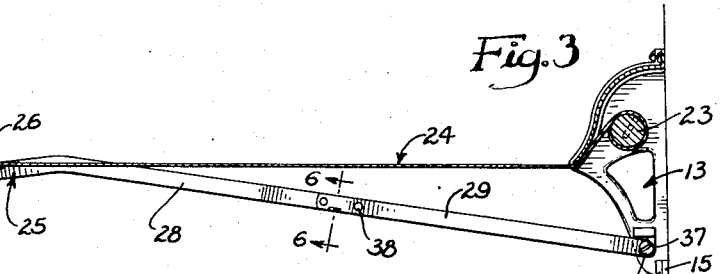
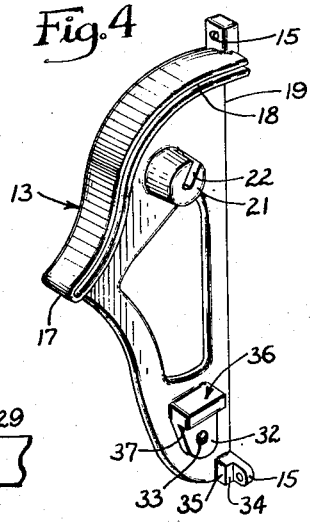
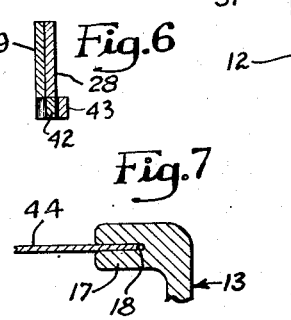
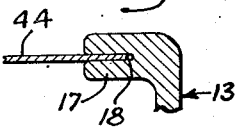
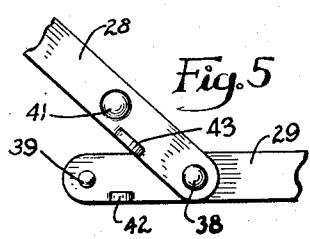
Inventor
Dominic DeRose Patented Sept. 14, 1954

2,689,002

UNITED STATES PATENT OFFICE 2,689,002

TRAILER AWNING

Dominic J. De Rose, Chicago, Ill.

Application July 17, 1951, Serial No. 237,243

3 Claims. (Cl. 160—23)

The invention relates to improvements in awnings and is more particularly concerned with a novelly constructed awning of a type adapted for use on house trailers and like vehicles. It should be understood, however, that although the awning construction is described herein as being particularly adapted for installation on house trailers its use is not so limited and it may be installed in association with an opening in any type of vehicle, building or wall structure.

House trailers are particularly difficult to provide with collapsible awnings because of the need for utmost rigidity in the awning when it is extended. There is need also for adequate means to prevent the awning braces from coming into contact with the wall upon which it is mounted, when the awning is collapsed. In both instances, the awning and its braces are under constant vibration hence any structural weakness or deficiency can be the cause of annoying sounds and possible defacement of the trailer body finish.

It is, therefore, an object of the present invention to provide a collapsible awning which will embody the desirable characteristics noted hereinabove.

Another object is to provide a durable awning construction which is not expensive to manufacture, but is easy to assemble, simple to install and operate, and very efficient in use.

Another object is to provide an awning of the character described with a protective cover having easily mounted end brackets incorporating means to prevent the awning braces from collapsing unintentionally when extended and, when closed or collapsed, from rubbing against the wall upon which the awning is mounted.

With the foregoing and other objects in view which will appear as the description proceeds, the invention consists of certain novel features of construction, arrangement and combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of my invention, I have illustrated in the accompanying drawings a preferred embodiment thereof, from an inspection of which, when considered in connection with the following description, my invention, its mode of construction, assembly and operation, and many of its advantages should be readily understood and appreciated.

Referring to the drawings in which the same characters of reference are employed to indicate corresponding or similar parts throughout the several figures of the drawings:

Fig. 1 is an elevational view of an awning embodying the features of the present invention.

Fig. 2 is a transverse vertical sectional view taken substantially on line 2—2 of Fig. 1.

Fig. 3 is a transverse sectional view similar to Fig. 2, but showing the awning fully extended.

Fig. 4 is a perspective view of one of the end brackets.

Fig. 5 is an enlarged fragmentary elevational view illustrating the hinge connection between the awning frame; and the braces.

Fig. 6 is an enlarged sectional detail view taken substantially on line 6—6 of Fig. 3.

Fig. 7 is a fragmentary enlarged detail sectional view taken on line 7—7 of Fig. 1.

Referring to the accompanying drawing, the awning embodying the features of the present invention is of a kind particularly adapted for installation and use on house trailers or the like. As best shown in Fig. 1, the awning is mounted over or above a window opening 11 in a wall 12 or other vertical supporting surface. It normally is adapted to be rolled (Fig. 2) so as not to protrude far beyond the wall 12 but, when in use, it is adapted to be extended substantially horizontally as illustrated in Fig. 3.

The awning construction includes a pair of end brackets 13, one of which is best illustrated in Fig. 4. As there shown, the bracket 13 preferably is in the form of a triangular casting adapted to be arranged with its apex disposed downwardly and its curved base constituting the upper edge thereof. The casting includes a pair of ears 15, one located at each end thereof, each adapted to receive suitable screws 16, or other means, provided for securing the bracket firmly to the supporting wall 12. The curved base of the bracket has an inwardly directed perpendicular flange 17 slotted, as at 18. The slot 18 is closed at its front end and opens onto the back edge 19 of the bracket in the manner illustrated.

A boss 21 is formed integral with and projects from the same face of the bracket as the flange 17. This boss is located below said flange, as viewed in Fig. 4, and in one of the pair of brackets it is provided with a slotted bearing 22. The boss 21 in the other bracket may have such a slotted bearing but will serve its purpose if provided with an axial recess, not shown.

When the pair of brackets 13 is mounted substantially in the position illustrated in Fig. 1, wherein one is disposed above and on each side of the window opening 11, a spring-wound roller 23 is extended between said brackets and is supported thereby. The spring-wound roller 23 is of conventional shade roller construction having a pin at one end to engage in one of the bosses 21 and a flat key projection on its other end to engage in the slotted bearing 22 of the other bracket 13. A sheet 24 of pliable or flexible material, such as fabric, has one of its ends firmly secured to the spring-wound roller 23, and it is adapted to be wound on said roller, as illustrated in Fig. 2, when the awning is in collapsible position.

The free or outer end of the sheet 24 carries a rigid U-shaped frame 25. In this connection it should be noted that the free end of the sheet 24 has a hem 26 through which the intermediate or bight portion 27 of the U-shape frame 25 extends. Each of the projecting arms 28 of the U-shaped frame 25 carries a brace or link 29 pivotally secured, as at 31, to the related end bracket 13. For this purpose each end bracket 13 is formed with a mounting area 32 adjacent the apex portion or lower end thereof. The mounting area 32 in the present disclosure is tapped, as at 33, to receive the mounting screw 31 for pivotally securing the link 29 thereto. When the awning is collapsed, as illustrated in Fig. 2, the links 29 depend substantially vertically from their mounting 31 on the brackets 13. The arms 28 of the U-shaped frame 25 are folded in substantial parallelism therewith so as to locate the free end of the sheet 24 closely adjacent to the roller 23.

It has been noted that awnings having a collapsible brace structure are a constant source of annoyance and irritation, when collapsed, due to the fact that the braces, links, or other devices normally employed for supporting the awning in extended position rub or scrape against the supporting wall. Such rubbing or scraping not only produces annoying sounds but also wears the finish off of the contacted surface. Means has, therefore, been provided in the present construction to prevent such rubbing or scraping of the brace structure or related parts. To this end the ear 15 on each bracket is formed with a lug 34 defining a shoulder 35 located in a plane corresponding to the plane assumed by the innermost edge of a link 29. As a consequence, the depending links 29 abut the shoulders 35 and are held in spaced relation with respect to the supporting wall 12.

When the sheet 24 is unrolled, it extends substantially perpendicular to the supporting wall 12 and is retained in this position through the toggle action of the arms 28 and links 29. Upon referring to Figs. 3 and 4, it will be observed that each end bracket 13 has a projection 36 forming a shoulder 37 along the upper extremity of the mounting area 32. The shoulder 37 is located with respect to the mounting of the link 29 so that when the link is in the extended position shown in Fig. 3, the upper edge thereof adjacent its mounted end abuts the shoulder to thereby limit upward movement of said link.

The hinge connection between each of the arms 28 and links 29 is perhaps best illustrated in Figs. 5 and 6. As shown, the free end of the arm 28 is pivotally secured, at 38, to the link 29 inwardly of the end of said link. The projecting end of the link 29 is formed with a detent projection 39 adapted to frictionally co-act with a detent projection 41 on the arm 28 when said arm and the link are in the straight line position illustrated in Fig. 3. Pivotal movement of the arm 28 and link 29 about the pivot 38 is limited in one direction, preferably by providing a stop 42 on the link 29 to abut an edge or notch 43 (Fig. 6) formed on the arm 28. Although any of many known means may be utilized to provide an abutment and a cooperating edge surface, it is preferred that these elements be formed in the respective parts by striking and offsetting portions of each of said parts out of their normal plane, in the manner illustrated.

Upon again referring to Fig. 3, it will be observed that the hinge connection 38 is located in a plane above the plane of a line drawn between the link pivot 31 and the bight portion 27 of the U-shaped frame 25. With this construction, the hinge connection between the arms 28 and links 29 is maintained rigid when the awning is extended due primarily to the toggle action afforded by the relative positions of the parts and the tension maintained thereon by the sheet 24 which normally is tensioned by the spring wound roller 23.

It is desirable to afford adequate protection for the sheet 24 when the same is rolled upon the roller 23. Accordingly, a sheet 44 of suitable material, preferably aluminium, is suitably shaped in cross-section to conform to the contour of the channels 18 in the end brackets 13. Said sheet or canopy has its end margins imbedded in said channels and is provided with a mounting flange 45 adapted to receive suitable retaining screws or the like 46.

It should be quite evident that the assembly of the instant awning structure is extremely simple, primarily because of the ease with which the various parts thereof may be associated one with the other and securely fixed in position. Although an exemplary embodiment of the invention has been shown in the accompanying drawing in detail and specifically described in the foregoing specification, it should be understood that the invention may embody a variety of modifications in its details of construction without departing from the spirit of invention or the scope of the appended claims.

I claim:

1. A bracket comprising a substantially triangular-shaped body having a contoured base and a flange on said base, said flange being perpendicular to one face thereof and being channelled to receive a cooperating part, a boss on said face located inwardly of the flanged base, a bearing in said boss adapted to receive a roller trunnion, a mounting area on said face located adjacent to the triangle apex and adapted to have means pivotally mounted thereon, and lugs on said face in the region of said area, said lugs being effective as stops to limit movement of said means.

2. A bracket comprising a substantially triangular-shaped body, a flange on the base of said body, said flange being perpendicular to one face of the body and being channeled to receive a cooperating part, a bearing on said body face located inwardly of the flanged base and adapted to receive a roller trunnion, a mounting area on said face located adjacent to the triangle apex and adapted to have means pivotally mounted thereon, and lugs on said face in the region of said area, said lugs being effective as stops to limit movement of said means.

3. A bracket comprising a substantially triangular-shaped body, a flange on the base of said body, said flange being perpendicular to one face of the body and being channeled to receive a cooperating part, a bearing on said body face located inwardly of the flanged base and adapted to receive a roller trunnion, a mounting area on said face located adjacent to the triangle apex and adapted to have means pivotally mounted thereon, and stops on said face in the region of said area effective to limit movement of said means.

References Cited in the file of this patent

UNITED STATES PATENTS

| Number | Name | Date |
|---|---|---|
| 162,488 | McGahey | Apr. 27, 1875 |
| 1,092,014 | Briggs | Mar. 31, 1914 |
| 1,096,476 | Weber | May 12, 1914 |
| 1,332,162 | Damon | Feb. 24, 1920 |
| 1,570,016 | Truemper | Jan. 19, 1926 |
| 1,747,345 | Bracken | Feb. 18, 1930 |
| 1,769,272 | Peaden | July 1, 1930 |
| 2,269,350 | Williams | Jan. 6, 1942 |